United States Patent
Powell et al.

[19]

[11] Patent Number: 6,130,536

[45] Date of Patent: Oct. 10, 2000

[54] PREFORM TEST FIXTURE AND METHOD OF MEASURING A WALL THICKNESS

[75] Inventors: Theron Powell, Pearly; Robert Johnson, Jackson, both of Miss.

[73] Assignee: Crown Cork & Seal Technologies Corporation, Alsip, Ill.

[21] Appl. No.: 09/115,033

[22] Filed: Jul. 14, 1998

[51] Int. Cl.[7] .............................. G01B 7/06; B29C 49/78
[52] U.S. Cl. .................... 324/229; 324/231; 324/261; 324/262; 264/40.1; 425/169
[58] Field of Search .................... 324/202, 226, 324/228–243, 261, 262; 209/567, 568; 33/501.03, 501.04, 549, 550, 551, 556, 820, 833, 834; 425/169; 264/40.1

[56] References Cited

U.S. PATENT DOCUMENTS

| | | | |
|---|---|---|---|
| 2,077,266 | 4/1937 | Rochte | 408/87 |
| 2,545,782 | 3/1951 | Hugin | 33/834 X |
| 2,717,011 | 9/1955 | Phinn | 408/62 |
| 3,489,040 | 1/1970 | Westhoff | 408/62 |
| 3,693,075 | 9/1972 | Förster | 324/40 |
| 3,863,351 | 2/1975 | Kalen | 33/549 X |
| 3,913,234 | 10/1975 | Windle | 33/147 E |
| 4,633,590 | 1/1987 | Lagasse | 33/148 R |
| 5,415,670 | 5/1995 | Schmidt | 409/140 |
| 5,419,056 | 5/1995 | Breitenstein | 33/549 X |
| 5,649,464 | 7/1997 | Gracey | 408/87 |
| 5,653,934 | 8/1997 | Brun, Jr. et al. | 264/334 |
| 5,727,295 | 3/1998 | Gracey | 82/113 |
| 5,744,088 | 4/1998 | De Cuyper | 264/297.2 |
| 5,772,951 | 6/1998 | Coxhead et al. | 264/537 |
| 5,788,429 | 8/1998 | Gracey | 408/87 |
| 5,840,350 | 11/1998 | Salemi | 425/533 |
| 5,876,157 | 3/1999 | Wethered | 408/104 |

FOREIGN PATENT DOCUMENTS

| | | |
|---|---|---|
| 0 536 626 A1 | 4/1993 | European Pat. Off. . |
| 2304429 | 10/1976 | France . |

OTHER PUBLICATIONS

Magna–Mike® Model 8000 Instruction Manual, Manual No. 910–088F, Panametrics, May 1, 1993.

*Primary Examiner*—Gerard Strecker
*Attorney, Agent, or Firm*—Woodcock Washburn Kurtz Mackiewicz & Norris LLP

[57] ABSTRACT

A preform test fixture for receiving a blow molding preform includes a structural base, a measuring device mount, a support arm, and a bar member having preform bores. The bar member is adjustable so that it translates up and down on the support arm, and is removably fastened thereto by a knob assembly screwed into a hole in the bar member. The system includes utilizing several bar members to enable the fixture to measure wall thicknesses of a virtually unlimited number of unique preform designs. The fixture also has a pivot device that enables the bar member to pivot on the support arm. The measuring device mount is adjustable on the base. The adjustment capability of the fixture enables uniform and repeatable wall thickness measurements, concentricity measurements at various locations, and preform tip wall thickness measurement proximate the preform gate.

28 Claims, 8 Drawing Sheets

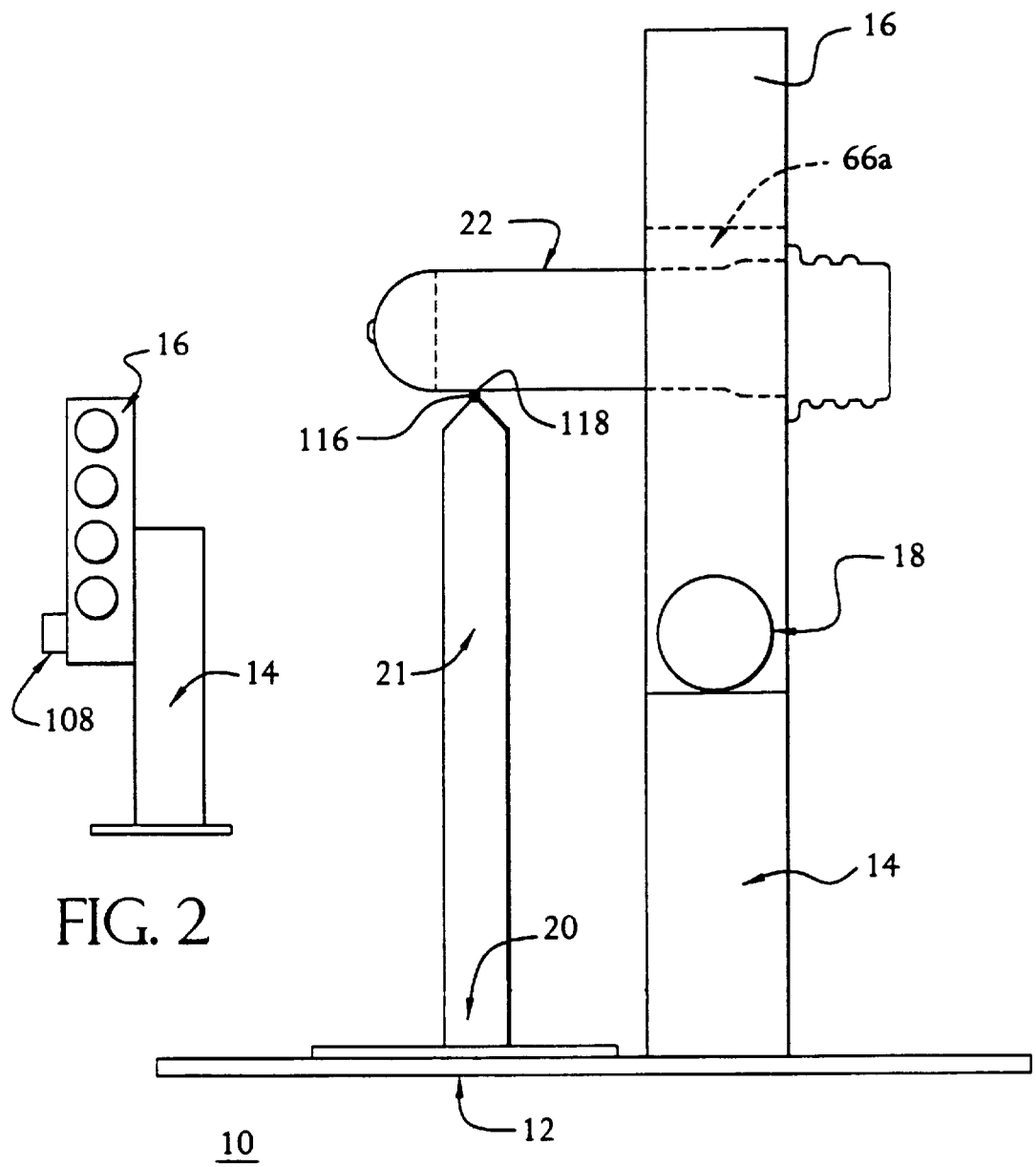

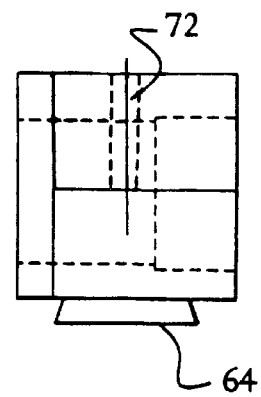
FIG. 11
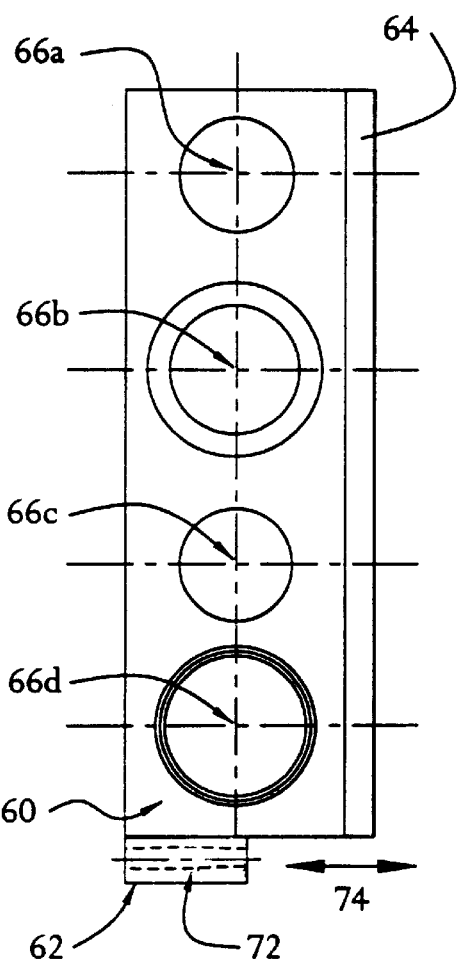
FIG. 10
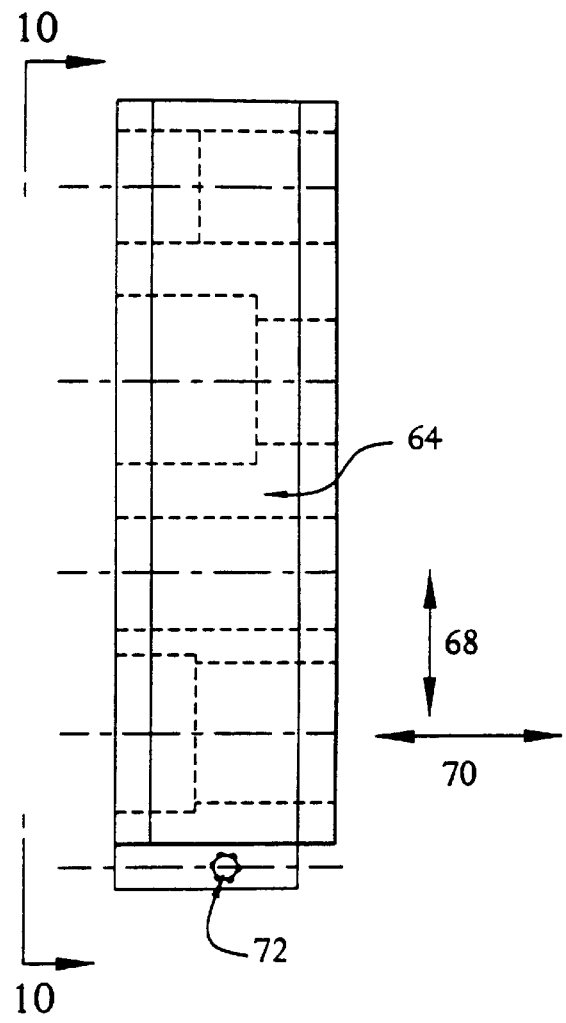
FIG. 9

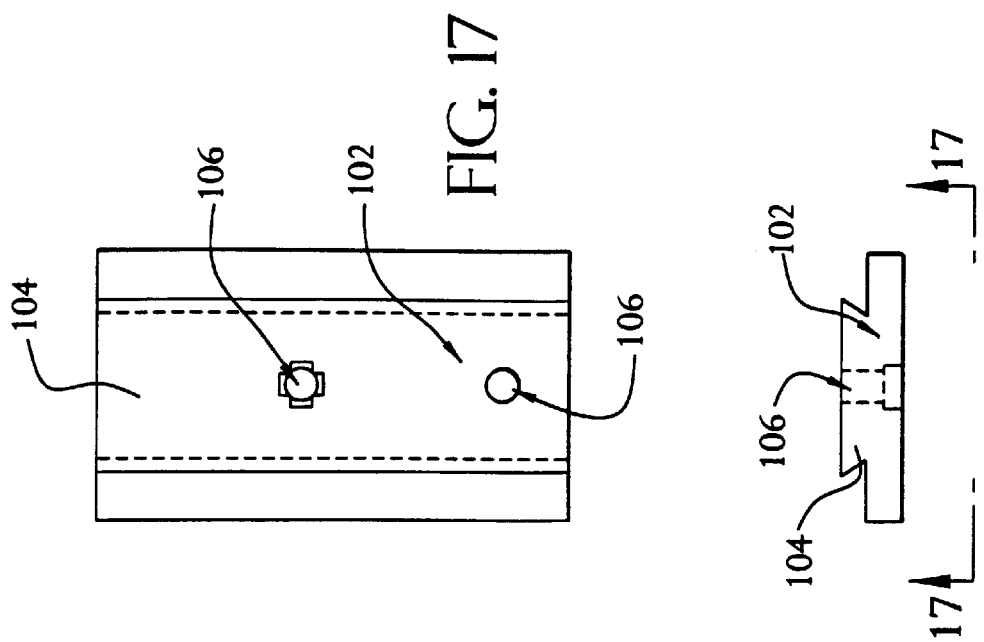
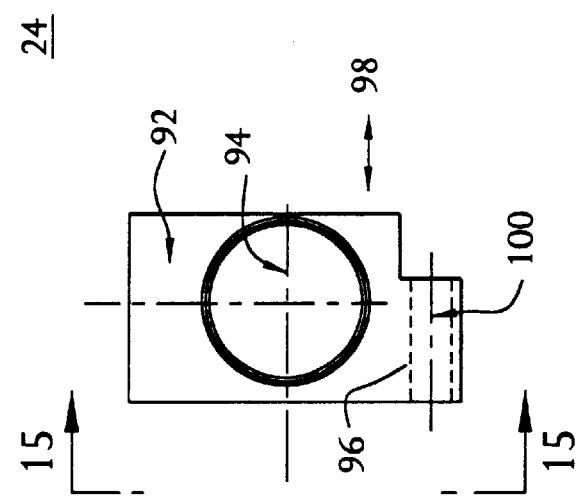
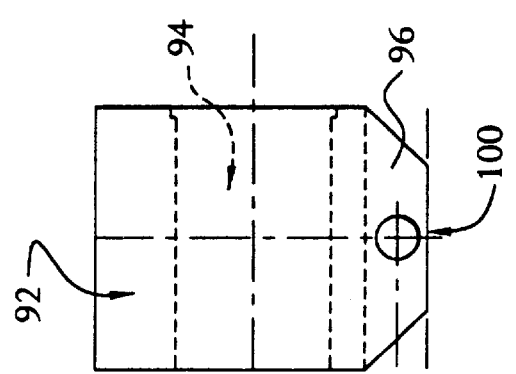

PREFORM TEST FIXTURE AND METHOD OF MEASURING A WALL THICKNESS

FIELD OF THE INVENTION

The present invention relates to measuring dimensions of articles of manufacture, and more particularly, to devices and methods for positioning a blow molding preform and for measuring the wall thickness and concentricity of a blow molding preform.

BACKGROUND OF THE INVENTION

Blow molding is a common process for forming plastic bottles and similar containers. The blow molding process typically includes heating and pressurizing the interior of a plastic preform inside a mold to expand the preform to the shape of the mold. Preforms are often formed of a thermoplastic, for example HDPE or PET, by injection molding, extrusion, or a combination of both methods.

Blow molding processes include injection blow molding and extrusion blow molding, each of which generally correspond to the method of forming the preform. The injection blow molding process typically conveys, mixes, melts, and injects resin into an injection mold, often using a screw conveyor. The extrusion blow molding process may be continuous, in which molds move around the preform and then move away from the extruder, or intermittent in which the extruder intermittently pushes the extrusion in a mold similar to injection blow molding.

A typical preform, of the type that may be blown into a plastic bottle, includes an open end, a substantially cylindrical body, and a rounded tip at a closed end. The open end may have screw threads formed near its neck, and a neck support ring, which forms the largest diameter of the preform. Between the cylindrical body and the rounded tip is a base transition line. At the end of the rounded tip is a portion of plastic termed a gate.

Preform design and production quality is crucial to forming a blow-molded container having sound physical properties. Further, because each final container design requires its own unique preform shape, quality control measures often must be modified to accommodate each preform. Preform wall thickness tolerances are crucial to proper bottle production. Specifically, concentricity, which is the degree to which wall thickness varies around the circumference of a section of the preform, is an important characteristic. For example, in injection molding, a predetermined volume of plastic is utilized for the preform. High concentricity may indicate that one part of the preform wall has too much of the plastic, and another part of the preform wall may have insufficient thickness to form an adequate container wall, or even that the wall may be formed with voids. Measuring the wall thickness of a preform is an important quality and inspection function. Instruments are employed to measure preform wall thickness. For example, a measuring device may have a magnetic sensor tip that measures the distance from the tip to a magnetic ball according to the Hall effect of the ball on the magnetic field. An example of such a measuring device is the MAGNA-MIKE(™) Model 8000 measuring device, available from Panametrics of Waltham, Mass.

SUMMARY OF THE PRESENT INVENTION

According to an aspect of the present invention, deficiencies and difficulties associated with the devices and methods of measuring preforms have been discovered and diminished. Specifically, although the magnetic measuring device, as well as similar devices, may work well in some environments, they produce uncertainty, inaccuracy, and imprecision when used to measure preform wall thickness for several reasons. First, holding a preform by hand while taking a measurement, especially if the operator is attempting to record concentricity or multiple measurements, provides unsatisfactory measurements. For example, unsteadiness, disuniform orientation, non-horizontal orientation of the preform, and the like produce disparate results.

Second, inconsistency in ball location, which may be caused by disuniform orientation of the preform, causes uncertain results. This uncertainty is exacerbated by surface imperfections in the preform, which may prevent the ball from resting in its proper position with respect to the probe tip. Third, accurate preform tip measurements are difficult to perform, especially proximate the preform gate. These drawbacks have resulted in uncertainty in inspection and quality, rejection of some preforms that might satisfy tolerance specifications if measured by another operator, and possible difficulty in standardizing tolerance specifications, and inspection and quality assurance procedures among separate manufacturing facilities.

Accordingly, it is an object of the invention to provide a preform test fixture that can receive various size preforms; that repeatably, accurately, and uniformly holds both the preform and measuring device on a common base; that enables both pivoting and vertical translation of the preform to aid in positioning; that firmly mounts and holds the measuring device and that enables sliding the measuring device to position the preform relative to the sensor tip; that enables rotation of the preform about its longitudinal axis to enable concentricity measurements, that enables measurement of preform wall thickness at the preform tip and gate region; and that includes removable bar members to enable a wide selection of preform diameters to be measured.

Preform test fixtures, according to the present invention, comprise a structural base, a measuring device, a measuring device mount, a support arm, and a bar member having preform bores. The present invention also encompasses the fixture without a measuring device. The bar member is adjustable so that it translates up and down on the support arm, and is removably fastened thereto by a fastener means. Preferably, the fastening means is a knob with a threaded shaft that is insertable into a threaded hole in the bar member. The preform test fixture also has a pivot device that enables the bar member to pivot on the support arm about the fastening means. The measuring device mount is adjustable on the base.

The structural base preferably comprises a generally U-shaped block having a recess surface that is machined to receive a base of the measuring device mount. The base has a slotted hole through which bolts may be used to tie-down the mount base. The structural base also has a hole having a counter bore on its bottom surface for receiving a support arm tie-down bolt. Thus, both the support arm and mount base may be affixed to the structural base, which promotes stability, resistance to vibration, and repeatability, among other attributes that will be clear to those familiar with common bases and precision instruments.

The support arm comprises a threaded hole that is used to tie-down the arm to the structural base, and a dovetail slot for receiving a corresponding dovetail of a bar member. The support arm may pivot around its longitudinal axis for prior positioning.

The bar member comprises multiple bores, each having a unique diameter (and possibly counter-bores or like features), a longitudinal dovetail on a side adjacent the bores, and a threaded hole in a lug. The dovetail may be inserted into the dovetail slot of the support arm, and vertically positioned to position the preform at it desired location. The bar member may be removably fastened to the arm by inserting a threaded rod, which is attached to a knob, into the lug hole until the end of the rod presses against the face of the dovetail slot. The dovetail will, thus, be forced outward against the dovetail slot and bound thereto.

Preferably, the multiple bores of various unique diameters enable receiving corresponding sizes of preforms. Further, the bar member is removable and may be interchanged with other, additional bar members to enable the fixture system to be used with even more preform diameters.

The measuring device mount includes the mount base and a measuring device holder having a bore for receiving the measuring device. Because the device mount is removable from the structural base, other measuring device mounts may be designed and manufactured to hold measuring devices other than the exemplary measuring device described herein.

The stability, flexibility, and adjustment capability of such fixtures, according to the present invention, is desirable because it enables uniform and repeatable wall thickness measurements, concentricity measurements at various locations, and preform tip wall thickness measurements proximate the preform gate, as well as other advantages that will be apparent to those skilled in the art.

The present invention encompasses a method of measuring the wall thicknesses and concentricity of a preform in both the body of a preform, at the preform tip, and proximate the gate. The method according to the present invention includes the steps of inserting the preform into a preform hole disposed in the bar member where the bar member's dovetail is inserted into the dovetail slot of the support arm; slidably positioning the bar member on the support arm to position the preform proximate the probe tip; positioning a slidable measuring device mount base on a structural base, and adjusting the mount base to position a measuring device probe tip proximate the preform; pivoting the support arm on the structural base to position the preform relative the probe tip; removably fastening the bar member to the support arm to position the preform proximate the probe tip; reading and recording the wall thickness measurements. Further, the preform may be rotated about its longitudinal axis to perform concentricity measurements. The fixture may also comprise the step of pivoting a pivot block that is coupled to the support arm to pivot the preform, such that a gate region of the preform may be positioned proximate the probe tip so as to measure the tip wall thickness and/or concentricity.

BRIEF DESCRIPTION OF THE DRAWINGS

FIG. 1 is a schematic view of an embodiment of the present invention;

FIG. 2 is a reduced side view of the embodiment of FIG. 1;

FIGS. 9, 10, and 11 are detailed views of the bar member according to the present invention;

FIGS. 14, 15, 16, and 17 are detailed views of the rotating device according to another aspect of the present invention;

DETAILED DESCRIPTION OF THE PREFERRED EMBODIMENTS

Figure 3:
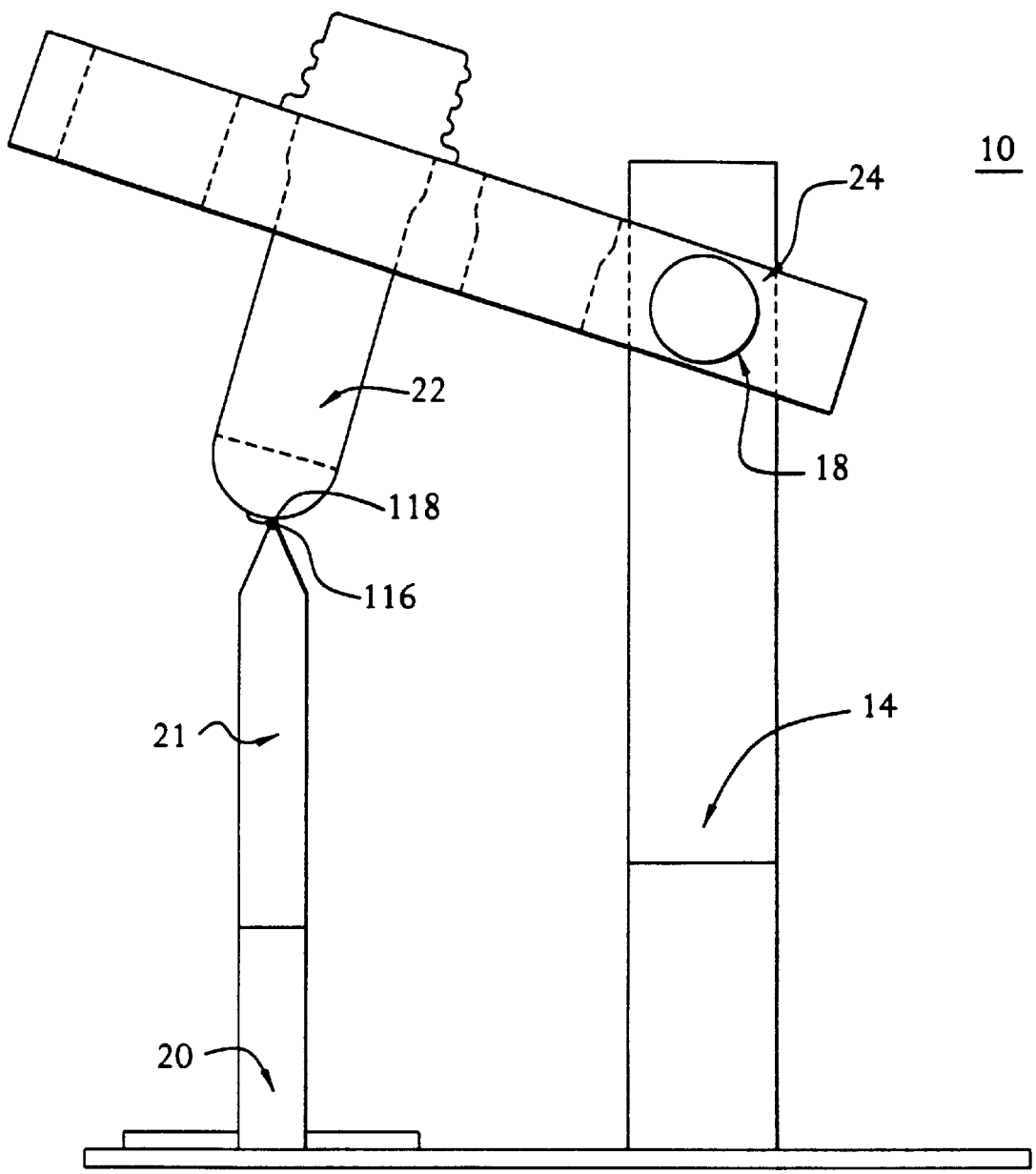
FIG. 3 is a view of another embodiment of the present invention including additional features.

Referring to FIGS. 1 and 2 to illustrate an embodiment of the present invention, a preform test fixture 10 comprises a structural base 12, a support arm 14, a bar member 16, a fastener means 18, and a measuring device mount 20. A preform 22 is shown inserted through bar member 16, which is shown in one of its vertically adjustable positions, as will be explained more fully below. FIG. 2 shows a reduced, side view of the embodiment of FIG. 1 with preform 22 and measuring device mount 20 removed for clarity. According to another aspect of the invention, as shown in FIG. 3, preform test fixture 10 also includes a pivot device 24.

Specific dimensional information of an embodiment of the present invention is provided herein. However, the dimensions provided in this description section are for exemplary purposes only and are not meant to limit the scope of the invention. Further, these dimensions may be to be varied according to machining tolerances, surface roughness, temperature variations during use, dirtiness of the atmosphere, and like variables of the preform or fixture, as will be understood by those generally familiar with the subject matter.

Further, as used herein and in the appended claims, the term "long" refers to a dimension of a corresponding object substantially parallel to a longitudinal axis; the term "height" refers to a dimension of a corresponding object in a substantially vertical orientation while the system 10 is oriented as shown in FIG. 1; the term "width" refers to a dimension of a corresponding object substantially perpendicular to the height as described immediately above; and the term "cross section" refers to a plane substantially perpendicular to a longitudinal axis. The term "longitudinal axis" is conventionally used herein with respect to a particular part to refer to an axis defined by the direction of the longest straight side of the part.

As used herein and in the appended claims, the term "translate" refers to an ability for one part to move linearly relative to another part, and is not limited to co-linear motion. Similarly, the term "rotate" refers to an ability of one part to move in an arc relative to another part, but is not limited to circumstances in which one part defines a center of radius of the other part. Specifically, the bar member 16 and preform 22 rotate relative to the probe tip, even though the center of radius of this rotation is preferably disposed at the knob assembly 108 on the support arm 14.

Figure 4:
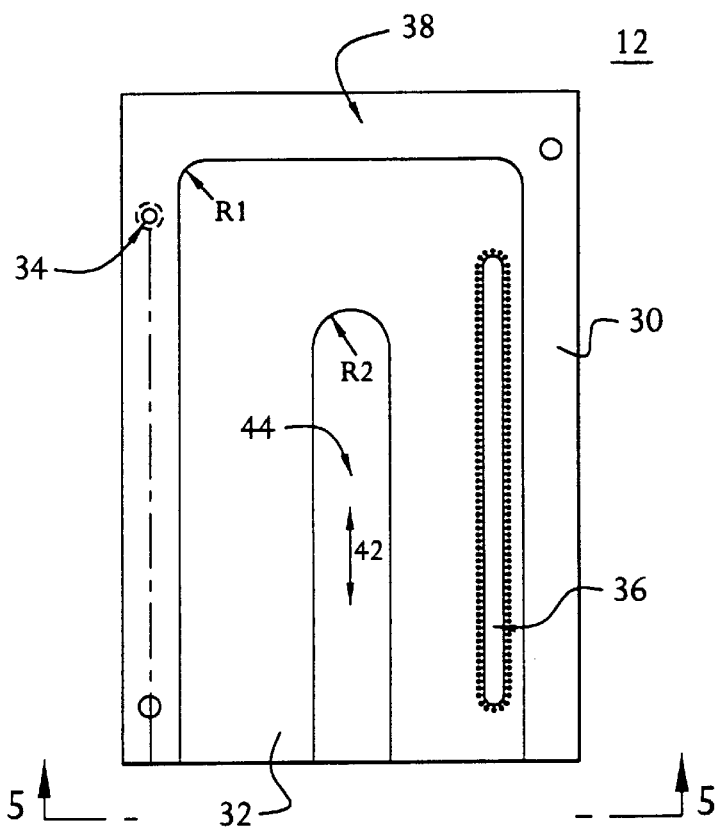
FIGS. 4, 5, and 6 are detailed views of the structural base according to the present invention.
Figure 5:
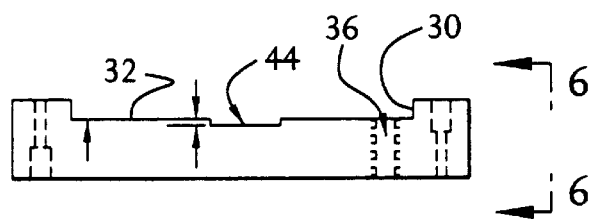
Figure 6:
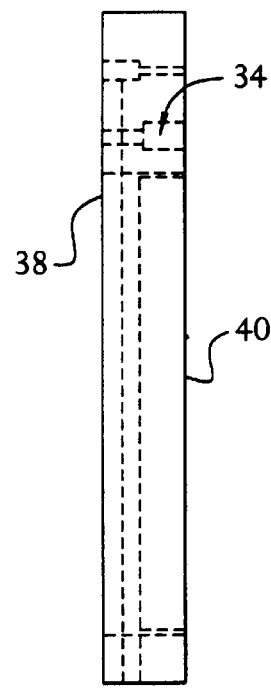

Referring to FIGS. 4, 5, and 6, support base 12 has a top side 38 and a bottom side 40. Top side 38 comprises a U-shaped sidewall 30 defining a substantially planar recess surface 32, which is approximately 0.230 inches below a top surface of sidewall 30 and approximately 4.510 inches wide. A threaded arm tie-down hole 34, which is disposed vertically through sidewall 30 to bottom side 40, preferably has a 0.375 inch diameter with 16 threads per inch. Arm tie-down hole 34 may be counter bored from bottom surface 40 to receive a socket head cap screw (not shown). Base 12 may have an overall longitudinal length of 8.9 inches, overall width of 6.0 inches, and overall height (that is from surface 38 to surface 40) of 1.0 inches. Unless otherwise noted, the term "thread," and variations thereof, will refer to threads per inch according to the Unified Screw Thread Standard (course series).

Recessed surface 32 has a slotted hole 36 therethrough to bottom surface 40. Slotted hole 36, which is parallel to a base longitudinal axis 42, may be 0.25 inches wide, 6.0 inches long, and have a counter bore (not shown in FIGS. 4–6) 0.375 inches wide along its entire length proximate bottom surface 40. Recess surface 32 also defines a slotted recess 44 that is recessed from surface 32 by approximately 0.050 inches, and that is approximately 6.0 inches long. Proximate the closed end of the sidewall 30, recess surface 32 and slotted recess 44 form radius R1 and radius R2, respectively, each of which are approximately 0.50 inches.

Figure 8:
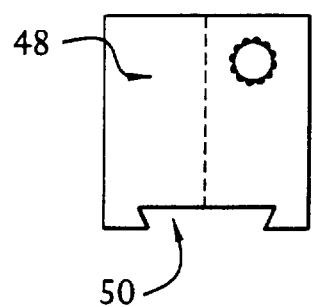
FIGS. 7 and 8 are detailed views of the support arm according to the present invention.
Figure 7:
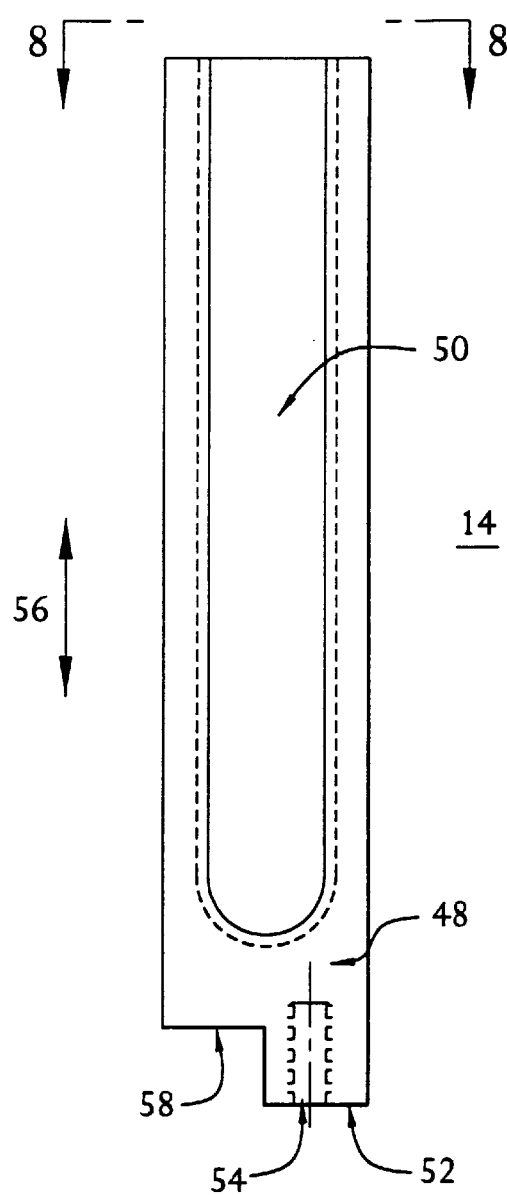

Referring to FIGS. 7 and 8, support arm 14 includes an arm shaft 48 having a longitudinal dovetail slot 50, a base contact surface 52 disposed at a lower end of arm shaft 48, and a threaded tie-down hole 54 that is longitudinally disposed and is formed in contact surface 52. The longitudinal orientation of dovetail slot 50 and tie-down hole 52 are defined according to shaft longitudinal axis 56. Support arm 14 has outside dimensions of 2.0 inches by 2.0 inches, and is 10.50 inches long.

Dovetail slot 50, which may also be referred to as a female dovetail slot, preferably is a 60° dovetail that is 1.103 inches and 1.293 inches wide at its narrowest and widest parts, respectively; 8.42 inches long; and approximately 0.20 inches deep. The open portion of dovetail slot is disposed at a top of shaft 48. Arm shaft 48 has an undercut portion 58 at its bottom portion such that contact surface 52 forms a footprint of 1.090 inches by 2.0 inches. Tie-down hole 52 may be 0.376 inches diameter, 1.0 inches deep, and have 16 threads per inch.

Referring to FIGS. 9, 10, and 11, bar member 16 comprises a body 60, a lug 62 disposed at the bottom of body 60, and a dovetail 64 disposed longitudinally on one side of body 60. Body 60 is approximately 1.987 inches square (not including dovetail 64) and 7.10 inches long (including lug 62) along a longitudinal axis 68.

Dovetail 64 has dimensions to mate with dovetail slot 50 of support arm 14. For example, dovetail 64 may be approximately 1.10 inches and 1.290 inches at its narrowest and widest parts, and approximately 0.193 inches deep, so as to fit within dovetail slot 50 with adequate clearance.

Body 60 defines perform bores 66a, 66b, 66c, and 66d therethrough along bar member transverse axis 70. Preform bores 66a–d are oriented to communicate with faces of body 60 adjacent a face on which dovetail 62 is disposed. Each one of preform bores 66a–d have a bore diameter to match a diameter of a preform that is to undergo testing. For example, preform bores 66a, 66b, 66c, and 66d may have diameters of 0.985 inches, 1.148 inches, 1.015 inches, and 1.2689 inches, respectively, to match exemplary preform outer diameters. Further, preform bores may have a counter bore to receive a portion of the preform, such as threads or a neck support ring. Preform bores 66a, 66b, and 66d show counter bores of various sizes, and bore 66c is shown without a counter bore.

Lug 62 has a 0.25 inch diameter threaded hole 72 disposed therethrough that is oriented along a lug hole axis 74, which is substantially perpendicular to axes 68 and 70. Lug 62 is approximately 1.032 inches long along axis 74.

Figure 13:
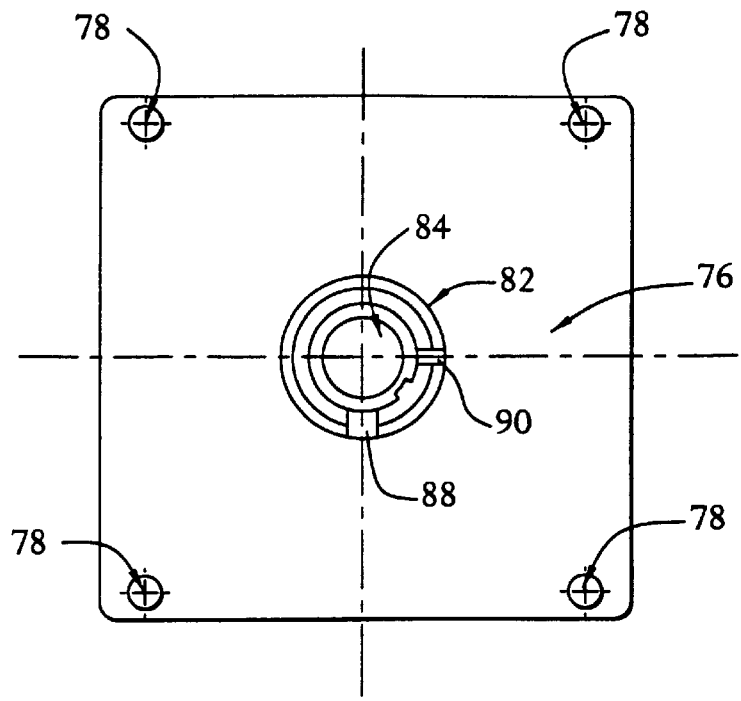
FIGS. 12 and 13 are detailed views of the measuring device mount according to the present invention.
Figure 12:
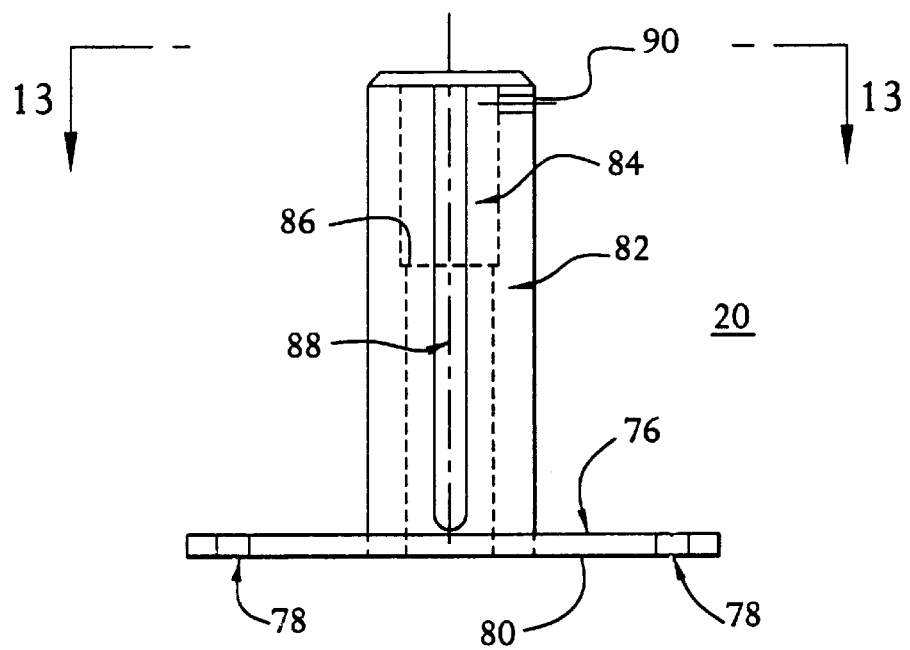

Referring to FIGS. 12 and 13, a measuring device mount 20 comprises a substantially planar mount base 76 and a substantially vertical measuring device holder 82. Mount base 76 is preferably 4.50 inches square and 0.180 inches thick, and has beveled corners. Mount base 76 has four mount base holes 78, each approximately 0.25 inches diameter, disposed proximate its corners, and a bottom contact surface 80.

Measuring device holder 82, which is approximately cylindrical, has a vertical holder bore 84 disposed therethrough, a holder keyway 88, and a set screw hole 90. Holder bore 84 preferably has a diameter of 0.760 inches and a 1.650 inch deep counter bore of 0.875 inches diameter that forms a bore shoulder 86 within bore 84. Holder bore 84 also extends through mount base 76 to communicate with bottom contact surface 80. Keyway 88 may be 0.270 inches wide and span substantially the height of holder 82. Set screw hole 90 is disposed through a wall of holder 82 to communicate with bore 84, and is threaded to receive a number 8 screw with 32 threads per inch.

Support arm 14 may be assembled to structural base 12 by placing base contact surface 52 on base top surface 38 proximate arm tie-down hole 34. A socket head cap screw (not shown) having threads matching those of tie-down hole 54 may inserted from the underside 40 and into tie-down hole 54 to secure support arm 14 to base 12. The cap screw (not shown) may be easily adjusted to enable support arm 14 to pivot about its longitudinal axis.

Bar member 16 may be assembled to support arm 14 by inserting dovetail 64 into dovetail slot 50 by the lug 62 end first. Bar member 16 may be secured at its desired location by a fastening means, for example screwing a set screw knob 108 (identified in FIGS. 2 and 18) through lug hole 72 until it contacts support arm 14 in the dovetail slot 50 to bind the dovetail 64 within dovetail slot 50. A more detailed description of a fastener that may be employed is provided below with reference to FIG. 18.

Mount 20 may be assembled to support base 12 by sliding mount base 76 so that mount base contact surface 80 is disposed on recess surface 32. The width of recess surface 32 is slightly larger than the width of base 76 to enable such an arrangement. A pair of screws (not shown) may be inserted though slotted hole 36 from the bottom surface 40 through mount base holes 78 and secured with nuts (not shown) to hold mount 20 to base 12.

The measuring device 21 may be mounted into measuring device mount 20 by inserting device 21 into bore 84 and securing device 21 therein by inserting and screwing a set screw (not shown) through set screw hole 90 until it contacts the surface of device 21.

Referring to FIGS. 14, 15, 16, and 17, according to another aspect of the present invention, the fixture system 10 further comprises the pivot device 24, which comprises a pivot block 92 and a pivot bar member 102. Pivot block 92 comprises a preform bore 94 (which is similar to bores 66a–d), lug 96 disposed at the lower portion of pivot block 92, and a pivot hole 100 disposed through lug 96. Pivot bar member 102 comprises a pivot member dovetail 104, and two threaded holes 106 disposed through the dovetail 104. Dovetail 104 is sized to be inserted into dovetail slot 50. Pivot block 92 may be approximately 2.5 inches high (including lug 96), 2.0 inches wide (that is normal to a transverse axis 98), and 1.49 inches deep along transverse axis 98.

Pivot device 24 may be mounted to support arm 14 by inserting pivot member dovetail 104 of pivot bar member 102 into dovetail slot 50. Pivot block 92 may be positioned so that pivot hole 100 is aligned with threaded hole 106. A knob assembly 108 may be inserted into hole 100, which preferably lacks threads, and through threaded hole 106 until the end of the shaft presses against the face of dovetail slot 50. Pivot block 92 may be pivoted around the knob shaft so as to incline preform bore 94. Alternatively, two knob assemblies may be employed such that a first knob assembly 108 is inserted through pivot hole 100 and into a top dovetail hole 106 (as described above), and a second knob assembly 108 is inserted into a lower dovetail hole 106 to hold dovetail 104 in place within slot 50. Although pivot block 92 is described as having only one perform bore 94, the present invention encompasses a pivot block having multiple perform bores, as generally shown in FIG. 3.

Figure 18:
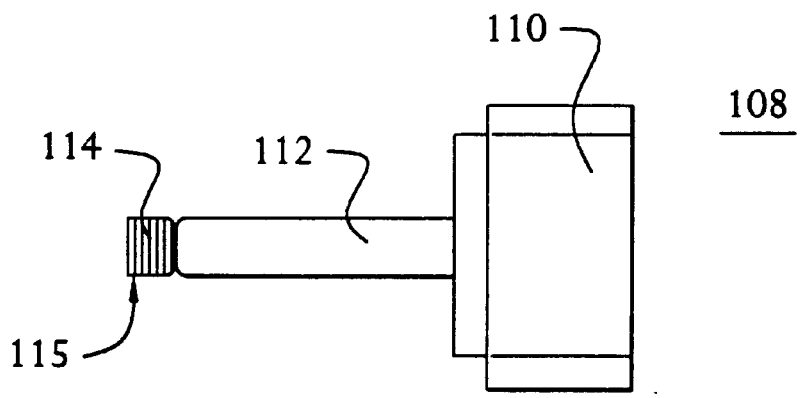
FIG. 18 is a view of a knob assembly.

Referring to FIG. 18, fastener 18 may comprise a knob assembly 108 that may be used to removably affix bar member 16 to support arm 14, and/or that may be used to removably affix pivot device 24 to support arm 14. Knob assembly 108 includes a knob 110, a shaft 112, and threads 114, which are preferably disposed at a distal tip 115. The dimensions of knob assembly 108 may be chosen to match the dimensions of the particular parts with which it is utilized, according to established machine design principles that will be apparent in light of the disclosure of this invention. Further, fastener means 18 according to the present invention may comprise conventional fastening mechanisms, such as, for example, a toggle to lock the parts together, vise grips, screw clamps, nuts-and-bolts assemblies, and rack and pinion adjustment assemblies, as will be understood by those familiar with such conventional mechanisms.

Measuring device 21 preferably comprises a MAGNA-MIKE(™) Model 8000 measuring device, available from Panametrics of Waltham, Mass., and includes a Model 801PR probe tip 116, and a corresponding ball 118. Measuring device 21 also includes an indicator means for indicating the measurements sensed by a sensor within probe tip 116. The indicator means (not shown in the Figures) may include any conventional means to produce usable data from the readings of the sensor and ball combination, including a standard control unit for the MAGNA-MIKE(™) Model 8000, a voltmeter, and a PC or programmable controller that accepts voltage measurements (for example via an input/output card) to indicate the voltage or voltage change corresponding to the strength of the magnetic field as effected by the proximity of the steel ball 118 to the probe tip 116.

All parts may be formed of aluminum, except the knob assembly 108, which preferably is formed of a cold rolled steel.

Figure 19:
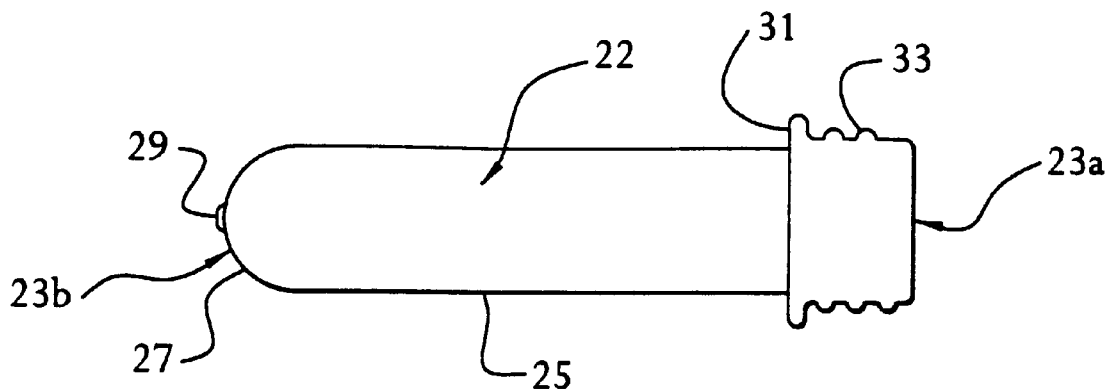
FIG. 19 is a preform of the type that may be measured and positioned by the present invention.

The present invention may be employed to measure the wall thickness of a preform 22 shown in FIG. 19. Preform 22 includes an open end 23*a*, a substantially cylindrical body 25, and a rounded tip 27 at a closed end 23*b*, which is opposite the open end. The open end 23*a* may have screw threads 33 formed near its neck, and a neck support ring 31, which forms the largest diameter of the preform. At the end of the rounded tip 27 is a portion of plastic termed a gate 29, which is typically an oblate ball shape.

Referring to FIGS. 1 and 2 to describe the operation of device of the present invention and a preferred method for measuring wall thickness according to the present invention, preform test fixture 10 may be operated by selecting or machining a bar member 16 having a preform bore 66*a* (which will be used to describe the operation of the present invention, although bores 66*b*, 66*c*, or 66*c* may alternatively be used) of a diameter suitable for holding the preform 22 to be measured. Dovetail 64 may be inserted into the open end of dovetail slot 50 of the support arm 14, until preform 22 is at a height suitable for measurement by probe tip 116. Bar member 16 may be held to support arm 14 by tightening knob assembly 108 until distal tip 115 of the knob assembly 108 contacts dovetail slot 50 to force the surfaces of dovetails 64 and 50 together.

Support arm 14 may be pivoted around the bolt that holds it through its tie-down hole 54, and mount base 76 of device mount 20 may slide in recess surface 32, to properly position preform 22 relative to probe tip 116. Bar member 16, support arm 14, and mount base 76 may be simultaneously adjusted or adjusted in close sequence so as to place preform 22 in a desired position and orientation relative to probe tip 116. As shown in FIG. 1, preform 22 is preferably oriented horizontally according to this embodiment of the invention in order to obtain accurate wall thickness measurements, especially at preform body 25. However, the present invention encompasses any orientation of preform 22, according to the geometry or other variables of the preform, as will be understood by those familiar with such preform variables.

Upon obtaining desired positioning of preform 22, measuring device 21 may be used to obtain a measurement of wall thickness. Concentricity measurements may be performed by placing probe tip 116 on the outside surface of preform 22 and ball 118 on the inside surface, and then slowly rotating or indexing preform 22 within preform bore 66*a* to obtain the desired measurements. For example, only the high and low wall thickness readings may be performed, or a map of the wall thickness by angular position may be performed, according to the requirements for the inspection or quality assurance/quality control program. The present invention encompasses computer control of the rotating or indexing step, as well as computer data logging and/or manipulation of the data to produce useful measurements.

Rotating preform 22 within preform bore 66*a* is enabled by providing a bore diameter that matches the outside diameter of preform 22. A lubricant (not shown) may be employed between the preform 22 and surface of bore 66*a*, and a collar (not shown) may be employed that fits around preform 22 and is machined to match the bore 66*a* diameter to facilitate rotating preform 22. FIGS. 1 and 3 show neck support ring 31 contacting a surface of bar member 16, although preform 22 should not be pressed against the bar member when making measurements, especially during rotating or indexing the preform, to prevent the surface of the neck support ring from causing excessive ovality of the preform body 25 during measurement.

Referring to FIG. 3, fixture 10 may also employ pivot device 24 to provide enhanced positioning ability and to enable fixture 10 flexibly to position preform 22. Knob assembly 108 holds pivot device 24 to the flat side (that is, the side opposite the dovetail 104) of pivot dovetail member 102. Pivot block 92, therefore, is not rotationally restricted, and may be pivoted around the knob shaft so as to incline preform bore 94. Because preform bore 94 is oriented perpendicular to pivot hole 100 and axis 98, preform bore 94 may be positioned as shown in FIG. 3.

Preform 22 may be positioned by sliding pivot device up or down along support arm 14, by pivoting pivot block 92, by pivoting support 14 around its longitudinal axis, and by sliding mount base 76. The respective tie-down bolts, setscrews, and fastening device may then be tightened. Wall thickness measurements may then be obtained as generally described above. An advantage of the embodiment of the present invention s is that measurement of the preform tip, from the base transition line to the gate, may accurately and repeatably by performed. Further, the concentricity of the tip, especially proximate the gate may be measured.

What is claimed is:

1. A preform test fixture comprising:
   a structural base;
   a measuring device having a probe tip and indicator means, the measuring device coupled to the base, the measuring device capable of measuring a wall thickness of a preform;
   a bar member having a preform bore disposed therethrough that is adapted for removably securing a preform therein, the bar member movably coupled to the base and capable of translating relative to the probe tip to position a preform proximate the probe tip, such that the preform is positioned relative to the probe tip to enable the measuring device to measure a wall thickness of the preform and;
   a pivot device to enable the bar member to pivot on the base relative to the probe tip to position a preform proximate the probe tip, such that the preform is positioned proximate the probe tip to enable the measuring device to measure a tip wall thickness of the preform.

2. The fixture of claim 1 wherein the bar member is adapted to enable rotating the preform in the preform bore, such that the preform may be rotated to enable the measuring device to measure concentricity of a preform.

3. The fixture of claim 1 wherein the probe tip comprises a magnetic sensor.

4. The fixture of claim 1 further comprising a magnetic object capable of insertion into the preform, such that the magnetic object cooperates with the magnetic sensor to yield a wall thickness measurement of the preform.

5. The fixture of claim 1 wherein the measuring device is slidably coupled to the base to enable positioning of the preform relative to the measuring device.

6. The fixture of claim 1 wherein the preform bore comprises a first preform bore having a first bore diameter, and the bar member comprises a second preform bore having a second bore diameter that is different from the first bore diameter; such that the first preform bore receives a preform of a different diameter than the second preform bore receives.

7. The fixture of claim 1 further comprising a support arm, having one end coupled to the base and another end slidably coupled to the bar member, such that the support arm slidably supports the bar member.

8. The fixture of claim 7 wherein the support arm is removably coupled to the bar member.

9. The fixture of claim 8 wherein the bar member comprises a longitudinal dovetail, and the support arm comprises a longitudinal dovetail slot, the bar member dovetail is insertable into the support arm dovetail slot to enable the bar member to be positioned relative to the support arm.

10. The fixture of claim 8 further comprising a fastener releasably coupling the bar member and the support arm together.

11. The fixture of claim 10 further comprising a knob assembly for releasably holding the bar member to the support arm, the knob assembly including a knob and a shaft having a threaded portion, and wherein the bar member comprises a hole having threads and capable of receiving the knob assembly shaft.

12. The fixture of claim 7 wherein the one end of the support arm is pivotally coupled to the base, such that each of the support arm and the bar member are adjustable to enable positioning of the preform relative to the measuring device.

13. The fixture of claim 7 further comprising a pivot device for pivotally coupling the bar member to the support arm.

14. The fixture of claim 13 wherein the pivot device comprises a pivot device dovetail member defining a first hole having threads therein, a pivot block defining a second hole therethrough, a threaded rod insertable into both the first hole and the second hole and capable of screwing into the threads of the first hole to pivotally and removably affix the pivot block to the pivot device dovetail member.

15. The fixture of claim 7 wherein the base comprises a substantially horizontal plate having:
   a recess portion for slidably receiving a measuring device mount; and
   a tie-down hole for receiving a set screw for pivotally fastening the support arm to the base.

16. A preform test fixture system comprising:
   a structural base;
   a support arm coupled to the structural base;
   a measuring device having a probe tip and indicator means, the measuring device coupled to the base, the measuring device capable of measuring a wall thickness of a preform; and
   a plurality of removable bar members, each one of the bar members defining a bore of a unique diameter and capable of: receiving a preform, being removably fastened to the support arm, and translating relative to the probe tip to position a preform proximate the probe tip; such that a bar member may be selected to match a diameter of the preform to be measured so as to enable the system to be used for a wide range of preform diameters and;
   a pivot device for enabling the bar member to pivot relative to the support arm, thereby enabling rotating the preform relative to the probe tip to position the preform proximate the probe tip.

17. The fixture system of claim 16 wherein the measuring device comprises a magnetic sensor and a magnetic object adapted for cooperating with the magnetic sensor to measure a wall thickness of the preform.

18. A preform test fixture system comprising:
   a structural base;
   a support arm coupled to the structural base;
   a measuring device having a probe tip and indicator means, the measuring device coupled to the base, the measuring device capable of measuring a wall thickness of a preform; and
   a plurality of removable bar members, each one of the bar members defining a bore of a unique diameter and capable of: receiving a preform, being removably fastened to the support arm, and translating relative to the probe tip to position a preform proximate the probe tip; such that a bar member may be selected to match a diameter of the preform to be measured so as to enable the system to be used for a wide range of preform diameters;
wherein each one of the bar members comprises plural preform bores.

19. A preform test fixture system comprising:
   a structural base;
   a support arm coupled to the structural base;
   a measuring device having a probe tip and indicator means, the measuring device coupled to the base, the measuring device capable of measuring a wall thickness of a preform; and a plurality of removable bar members, each one of the bar members defining a bore of a unique diameter and capable of: receiving a preform, being removably fastened to the support arm, and translating relative to the probe tip to position a preform proximate the probe tip, such that a bar member may be selected to match a diameter of the preform to be measured so as to enable the system to be used for a wide range of preform diameters; and defining a pivot member capable of removably and pivotally coupling any one of the bar members to the support arm.

20. A preform test fixture system for measuring a wall thickness of a preform, comprising:

a substantially horizontal structural base;

a measuring device mount, slidably coupled to the base, and defining a bore therein;

a measuring device having a probe tip and indicator means, the measuring device removably insertable into the bore of the measuring device mount and removably coupled thereto, the measuring device capable of measuring a wall thickness of the preform;

a substantially vertical support arm having a longitudinal dovetail slot disposed therein, the support arm pivotally coupled to the base to enable the preform to be positioned proximate the probe tip; and a removable bar member having:
  a bore defined therein that is capable of receiving the preform;
  a longitudinal dovetail that is insertable into the dovetail slot of the support arm and capable of being removably fastened thereto to enable the bar member to translate relative to the probe tip to position a preform proximate the probe tip.

21. The fixture system of claim 20 wherein the measuring device comprises a magnetic sensor and a magnetic object adapted for cooperating with the magnetic sensor to measure a wall thickness of the preform.

22. The fixture system of claim 20 further comprising a pivot device including a pivot device dovetail member defining a first hole having threads therein, a pivot block defining a second hole therethrough, a threaded rod insertable into both the first hole and the second hole and capable of screwing into the threads of the first hole to pivotally and removably affix the pivot block to the pivot device dovetail member and capable of removably holding the pivot device dovetail to the supports arm.

23. A preform test fixture system for positioning a preform, comprising:

a substantially horizontal structural base;

a measuring device mount, slidably coupled to the base, and defining a bore therein capable of receiving a measuring device having a probe tip;

a substantially vertical support arm having a longitudinal dovetail slot disposed therein, the support arm pivotally coupled to the base to enable the preform to be positioned proximate the probe tip;

a removable bar member having:
  a bore that is capable of receiving the preform;
  a longitudinal dovetail that is insertable into the dovetail slot of the support arm and capable of being removably fastened thereto to enable the bar member to translate relative to the probe tip to position a preform proximate the probe tip;
  a bore defined therein capable of receiving and holding the preform, such that a preform may be adjustably positioned proximate the probe tip.

24. The fixture system of claim 23 further comprising a pivot device including a pivot device dovetail member defining a first hole having threads therein, a pivot block defining a second hole therethrough, a threaded rod insertable into both the first hole and the second hole and capable of screwing into the threads of the first hole to pivotally and removably affix the pivot block to the pivot device dovetail member and capable of removably holding the pivot device dovetail to the supports arm.

25. A method of measuring a wall thickness of an exterior surface of a body or a tip of a preform, comprising the steps of:

inserting the preform into a preform bore disposed in a member, the member being slidably coupled to support arm;

slidably positioning the member on the support arm to position the preform proximate a measuring device probe tip;

positioning a slidable measuring device mount base on a structural base, and adjusting the mount base to position the measuring device probe tip proximate the preform;

pivoting the support arm on the structural base to position the preform relative the probe tip;

removably fastening the bar member to the support arm to position the preform proximate the probe tip; and measuring a wall thickness of the preform and recording the wall thickness measurement.

26. The method of measuring of claim 25 wherein the preform is oriented substantially horizontally and the member comprises a bar member, and wherein the positioning the member step comprises sliding a bar member dovetail vertically in a dovetail slot of the support arm.

27. The method of measuring of claim 25 further comprising the step of:

pivoting the bar member to rotate the preform relative to the probe tip.

28. The method of measuring of claim 27 wherein the inserting the preform step comprises inserting the preform into a preform bore disposed in a pivot block that is pivotally coupled to a pivot bar member having a dovetail disposed thereon that is insertable into a dovetail slot of the support arm; and further comprising the step of pivoting the pivot block to rotate the preform relative to the probe tip, such that a gate region of the preform may be positioned proximate the probe tip so as to measure the tip wall thickness.

* * * * *